(12) United States Patent
Rodman

(10) Patent No.: US 9,478,233 B2
(45) Date of Patent: Oct. 25, 2016

(54) SPEECH FRAGMENT DETECTION FOR MANAGEMENT OF INTERACTION IN A REMOTE CONFERENCE

(71) Applicant: Polycom, Inc., San Jose, CA (US)

(72) Inventor: Jeffrey C. Rodman, San Francisco, CA (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 14/209,465

(22) Filed: Mar. 13, 2014

(65) Prior Publication Data

US 2014/0278399 A1 Sep. 18, 2014

Related U.S. Application Data

(60) Provisional application No. 61/785,550, filed on Mar. 14, 2013.

(51) Int. Cl.
*G10L 15/04* (2013.01)
*G10L 25/78* (2013.01)
*H04M 3/56* (2006.01)

(52) U.S. Cl.
CPC .............. *G10L 25/78* (2013.01); *H04M 3/568* (2013.01); *H04M 2201/40* (2013.01); *H04M 2203/252* (2013.01)

(58) Field of Classification Search
CPC ..... G10L 15/26; G10L 15/265; G10L 21/06; G10L 17/00; G10L 15/20; G10L 25/78; G10L 15/24; H04M 3/56; H04M 2201/40; H04M 3/42221; H04M 3/567; H04M 2201/41; H04N 7/15; H04N 7/147

USPC ......... 704/235, E15.043, 270, E21.019, 246, 704/E15.039, 231, 233, 275, 276, E11.003; 379/202.01, 93.21, 158; 370/260; 348/14.08–14.09, E7.083; 455/416; 709/204

See application file for complete search history.

(56) References Cited

U.S. PATENT DOCUMENTS

| | | | |
|---|---|---|---|
| 6,593,956 B1 | 7/2003 | Potts et al. | |
| 6,894,714 B2 | 5/2005 | Gutta et al. | |
| 8,243,902 B2* | 8/2012 | Caspi et al. | 379/202.01 |
| 8,593,501 B1* | 11/2013 | Kjeldaas | 348/14.01 |
| 2002/0150263 A1* | 10/2002 | Rajan | 381/92 |
| 2004/0128140 A1* | 7/2004 | Deisher | 704/275 |
| 2008/0297587 A1 | 12/2008 | Kurtz et al. | |
| 2011/0285807 A1 | 11/2011 | Feng | |
| 2012/0327180 A1 | 12/2012 | Thorson et al. | |

* cited by examiner

*Primary Examiner* — Marivelisse Santiago Cordero
*Assistant Examiner* — Stephen Brinich
(74) *Attorney, Agent, or Firm* — Blank Rome, LLP

(57) ABSTRACT

A conferencing system and method involves conducting a conference between endpoints. The conference can be a videoconference in which audio data and video data are exchanged or can be an audio-only conference. Audio of the conference is obtained from one of the endpoints, and speech is detected in the obtained audio. The detected speech is analyzed to determine that the detected speech constitutes a speech fragment, and an indicia indicative of the determined speech fragment is generated. For a videoconference, the indicia can be a visual cue to be added to video for the given endpoint when displayed at other endpoints. For an audio-only conference, the indicia can be an audio cue to be added to the audio of the conference at the other end points.

34 Claims, 5 Drawing Sheets

SPEECH FRAGMENT DETECTION FOR MANAGEMENT OF INTERACTION IN A REMOTE CONFERENCE

CROSS-REFERENCE TO RELATED APPLICATION

This application claims the benefit of U.S. Provisional Appl. 61/785,550, filed 14 Mar. 2013, which is incorporated herein by reference in its entirety.

BACKGROUND OF THE DISCLOSURE

When meetings are held among people who are not in the same location, having a fluid back-and-forth conversation is usually difficult because there are added problems such as latency, sound location, and poor fidelity. Moreover, certain forms of communication, such as subtle visual or aural cues, may be missed during a videoconference or teleconference because they occur out of the range of a camera or a microphone. For example, a participant may make a quiet sigh or tap his fingers, signaling impatience or boredom, and those clues may not be captured or conveyed during the conference to other participants.

In teleconferencing, some aural cues can break into an ongoing flow of a conversation, and participants may spend two or more seconds of exchanging confusing request and answers, such as "What? . . . " "No . . . " "Did someone ask something?" "No, you go ahead . . . " Such exchanges can be all the more frustrating for conferences having three or more remote locations. Moreover, having one or more participants talking on cellular phones during the conversation can aggravate these problems due to the higher latency caused by the low fidelity audio from cellular phones.

The most commonly accepted solutions to enhance a videoconference use full-duplex audio and good quality video. In full-duplex audio, both sides of a two-way conference can speak at the same time. Although this may make participants aware of an interruption, the audio does not effectively indicate which participant spoke or vocalized. As meetings become three-way or more, full-duplex audio rapidly grows less effective.

With point-to-point sessions, participants can see each other and tell when one is signaling, raising an eyebrow, or opening their mouth. However, in multipoint sessions using composite displays of multiple participants, participants may not be able to easily to tell which participant is doing what. Additionally, in a switched multipoint video session where the display switches between showing different locations of the multipoint session, the switching between views of participants can take considerable time and add confusion. Additionally, built-in delay between switching may be used during the session so that the system does not switch views between locations unless audio of a particular length comes from participants at a location other than the one being currently displayed.

While a good video and audio connection can help, even a good connection does not necessarily cure the problems noted above. Further, the very best video connections (such as immersive telepresence) are usually unavailable to most participants.

The subject matter of the present disclosure is directed to overcoming, or at least reducing the effects of, one or more of the problems set forth above.

SUMMARY OF THE DISCLOSURE

In a conferencing method, a conferencing apparatus (e.g., multipoint control unit or endpoint) obtains audio of a conference and detects speech in the obtained audio. For example, to detect the speech, the audio can be filtered into separate subbands, and energy levels of the filtered audio can be found that are indicative of speech.

When speech is detected, the detected speech is determined to constitute a speech fragment or not. If the detected speech is not a fragment (i.e., it is related to continuing speech of a participant during the conference), then the audio of that speech can be handled normally and be sent for output during the conference. If the detected speech does constitute a fragment, then the audio of that speech can be handled differently. For example, the detected speech may not be related to the continuing speech of a participant during the conference, and instead the fragment may come from another participant interjecting or attempting to make a point.

In response to detecting the speech fragment, an indicium is generated indicative of the speech fragment, and this generated indicium is included in data of the conference. This means that the included indicium is separate from the audio associated with the detected speech fragment. In other words, the audio obtained during the conference that constitutes the speech fragment may or may not be sent for output during the conference. However, the included indicium is separate from that audio and can include an audio or visual cue.

Determining that the detected speech constitutes the speech fragment can involve determining that the detected speech is of a short duration, interrupts current speech, is initiated from a source (identity, location, participant, etc.) other than the current speaker, has a particular character, etc. For example, a duration of the detected speech can be determined to be less than a predetermined duration, indicating it is merely a brief phrase, single word, etc.

Alternatively, source identities of detected speech can be determined and stored in memory during the conference. For example, determining the source identities of the detected speech can involve determining relative spatial locations of the sources of the detected speech or can involve performing speech recognition of the detected speech and associating the recognized speech to participants as the source identities.

Then, to determine that the detected speech constitutes a speech fragment, a determination can be made that the detected speech is associated with a the new source identity different than a current source identity stored in memory (i.e., associated with a new participant other than the participant currently speaking). This may indicate that a participant in the conference is attempting to interrupt or interject.

Determining that the detected speech constitutes the speech fragment can involve determining that a character of the detected speech meets at least one criterion. The particular character of the speech fragment can include intonation, pitch, inflection, emotion, duration, or other quantified speech recognition detail (i.e., quantified detail obtained from speech recognition analysis of comparable phrases or fragments of speech).

As noted above, the generated indicium can be a visual cue, which can be included in video data of the endpoint. In this way, participants during the conference can receive this visual cue, which may indicate that another participant has a question, wants to speak next, wants to interject, etc. This visual cue is generated and included based on the determined speech fragment during processing. The visual cue can be output during the conference in addition to or instead of the underlying speech fragment's audio from which it was generated.

As noted above, the generated indicium can be an audio cue, which can be included in audio data of the endpoint. In this way, participants during the conference can receive this audio cue, which may indicate that another participant has a question, wants to speak next, wants to interject, etc. This audio cue is generated and included based on the determined speech fragment during processing. The audio cue can be output during the conference in addition to or instead of the underlying speech fragment's audio from which it was generated In either case, generating the visual and audio cue can involve matching the determined speech fragment to one of a plurality of cues, and selecting the matched cue for inclusion as the generated indicium. Finally, both audio and visual cues can be used separately or together in the data for the conference depending on the capabilities of the endpoints, the type of cue, or other factors.

The foregoing summary is not intended to summarize each potential embodiment or every aspect of the present disclosure.

DETAILED DESCRIPTION OF THE DISCLOSURE

Figure 1A:
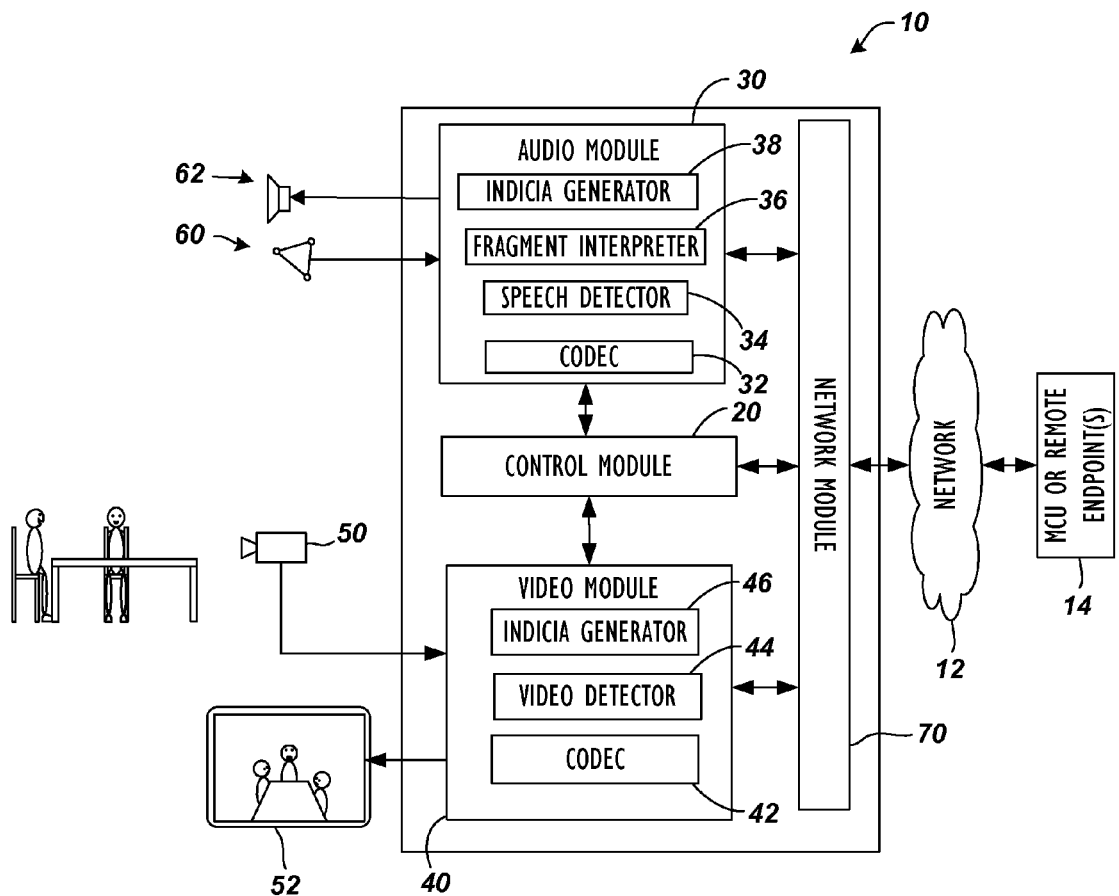
FIG. 1A illustrates a videoconferencing system according to certain teachings of the present disclosure.

A videoconferencing system 10 in FIG. 1A communicates with one or more remote endpoints 14 via a multipoint control unit over a network 12. Among some common components, the system 10, which can be an endpoint, has an audio module 30 with an audio codec 32 and has a video module 40 with a video codec 42. These modules 30/40 operatively couple to a control module 20 and a network module 70.

During a videoconference, a camera 50 captures video and provides the captured video to the video module 40 and codec 42 for processing. Additionally, one or more microphones 60 capture audio and provide the audio to the audio module 30 and codec 32 for processing. These microphones 60 can be table or ceiling microphones, or they can be part of a microphone pod or the like. The system 10 uses the audio captured with these microphones 60 primarily for the conference audio.

After capturing audio and video, the system 10 encodes them using any of the common encoding standards, such as MPEG-1, MPEG-2, MPEG-4, H.261, H.263 and H.264. Then, the network module 70 outputs the encoded audio and video to the remote endpoints 14 via the network 12 using any appropriate protocol. Similarly, the network module 70 receives conference audio and video via the network 12 from the remote endpoints 14 and sends these to their respective codec 32/42 for processing. Eventually, a loudspeaker 62 outputs conference audio, and a display 52 outputs conference video. Many of these modules and other components can operate in a conventional manner well known in the art so that further details are not provided here.

The audio module 30 uses a speech detector 32 to detect speech in captured audio from the microphones 60 and then determines a location of a current speaker, which can be used to steer the camera 50 toward that location or for other purposes disclosed below. Also, the video module 20 can process video information using a video detector 44 to determine motion, facial recognition, skin tone detection, and the locations of participants, which can also be used for purposes disclosed below.

In addition to some of these conventional components, the audio module 30 has a speech fragment interpreter 36 for analysing fragments of speech detected by the speech detector 34. Furthermore, the audio module 30 has an indicia generator 38, and the video module 40 has an indicia generator 48. These generators 38 and 48 generate indicia of an interpreted speech fragment. Details related to these components are discussed later.

In general, the audio components 34, 36 can analyze audio obtained locally at the near-end by the microphones 60 and/or can analyze audio obtained remotely from the far-end endpoints 14 via the network module 70. The audio generator 38 can generate indicia and can add it to audio captured by the local microphones 60 and/or add it to audio received from the far-end endpoints 14 via the network interface 70. Likewise, the video generator 48 can generate indicia and add it to video captured by the local camera 50 and/or add it to video received from the far-end endpoints 14 via the network interface 70.

Figure 1B:
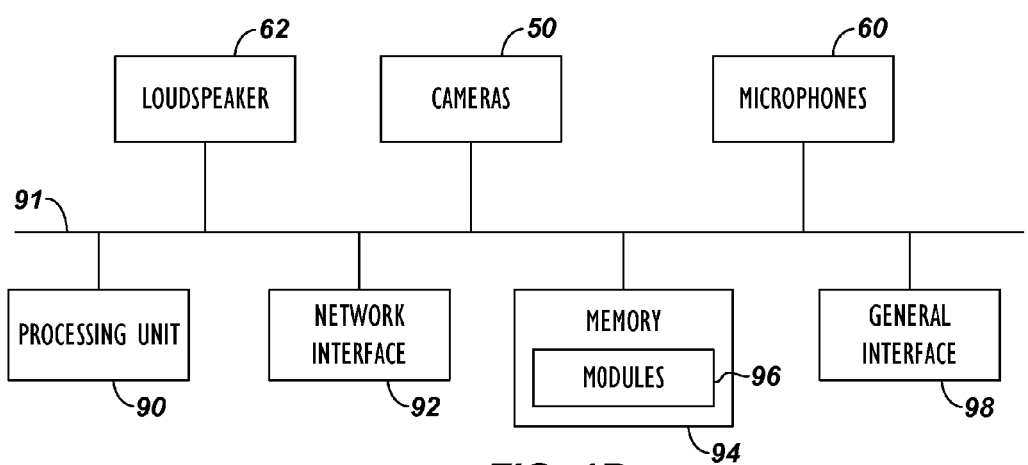
FIG. 1B schematically illustrates components of the videoconferencing system.

FIG. 1B shows some exemplary components for the videoconferencing system 10 of FIG. 1A. As shown and discussed above, the system 10 has the cameras 50, the microphones 60, and the loudspeaker 62. In addition to these, the system 10 has a processing unit 90, a network interface 92, memory 94, and a general input/output (I/O) interface 98 all coupled via a bus 91.

The memory 94 can be any conventional memory such as SDRAM and can store modules 96 in the form of software and firmware for controlling the system 10. In addition to video and audio codecs and other modules discussed previously, the modules 96 can include operating systems, a graphical user interface (GUI) that enables users to control the system 10, and algorithms for processing audio/video signals and controlling the camera 50 as discussed later.

The network interface 92 provides communications between the system 10 and remote endpoints (not shown). By contrast, the general I/O interface 98 provides data transmission with local devices such as a keyboard, mouse, printer, overhead projector, display, external loudspeakers, additional cameras, microphone pods, etc.

The camera 50 and the microphones 60 capture video and audio, respectively, in the videoconference environment and produce video and audio signals transmitted via the bus 91 to the processing unit 90. Here, the processing unit 90 processes the video and audio using algorithms in the modules 96. For example, the system 10 processes the audio captured by the microphones 60 and direct the main camera 50. Ultimately, the processed audio and video can be sent to local and remote devices coupled to interfaces 92/98.

Figure 2:
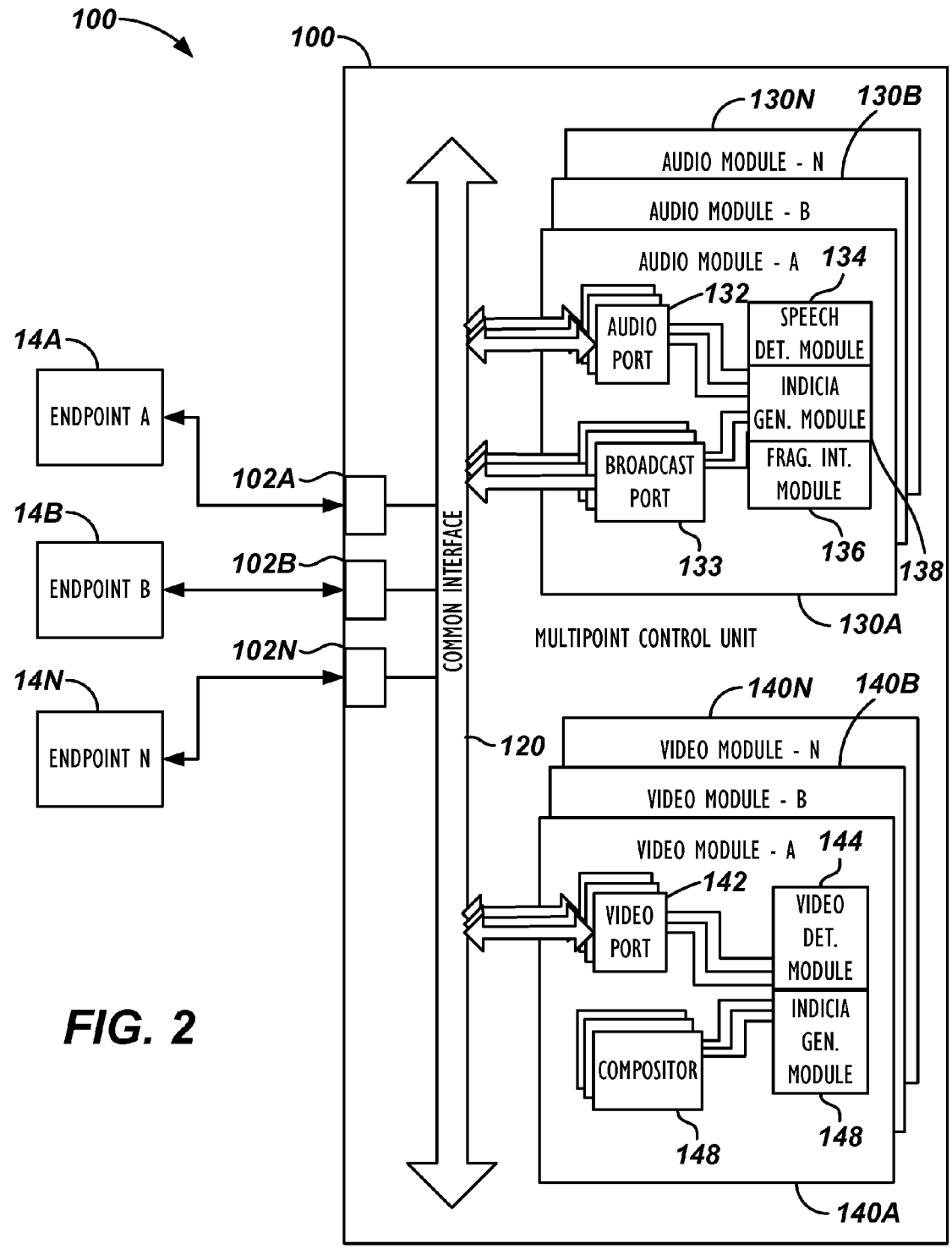
FIG. 2 illustrates the disclosed videoconferencing system as a multipoint control unit.

Although shown as part of an endpoint, the components for analyzing speech fragments and generating indica can be implemented in a multipoint control unit, as schematically shown in the system 10 of FIG. 2. Briefly, the system 10 as a multipoint control unit 100 has a number of input/output connections 102a-n to various endpoints 14a-n that it handles for videoconference calls. These connections 102a-n couple to a common interface 120, which in turn connects to various audio modules 130a-n and video modules 140a-n for each of the connected endpoints. A number of conventional components of the unit 100 are not shown for simplicity.

As is typical, the audio modules 130a-n handle the audio for the endpoints 14a-n, and the video modules 140a-n handle the video for the endpoints 14a-n. For example, one audio module 110a can receive the input (near-end) audio from a dedicated endpoint 14a for sending on to one or more other endpoints in a video conference call. Likewise, the same audio module 110a can send output (far-end) audio from the other endpoints to the dedicated endpoint 14a.

To handle the sending and receiving of audio between the endpoints, each module 130 can have audio ports 132 and/or broadcast ports 133 for the endpoints in the call, depending on how the calls are set up. For example, an audio port 102 can be assigned to one of the endpoints in the call to which the endpoint dedicated to the module 130 is participating in, and the port 102 can be used to send and receive audio with that endpoint. On the other hand, the broadcast port 133 can be assigned to one of the endpoints in the call that is only receiving audio.

The video modules 140a-b operate in a similar manner and have video ports 142 and compositors 148, which are responsible for compositing the various video signals from the inputs into a composite image for display at the endpoints in the call. In addition to the conventional components described above, the audio modules 130a-n have a speech detection module 134 and fragment interpreter module 136, and the video modules 130a-n have video detection modules 144 and indicia generation modules 146. These modules 134, 136, 144, and 146 operate in a manner similar to those modules (e.g., 34, 36, 44, and 48: FIG. 2) discussed above with reference to the endpoint (14), expect that the multipoint control unit is responsible for the processing, determinations, and the like.

Figure 3:
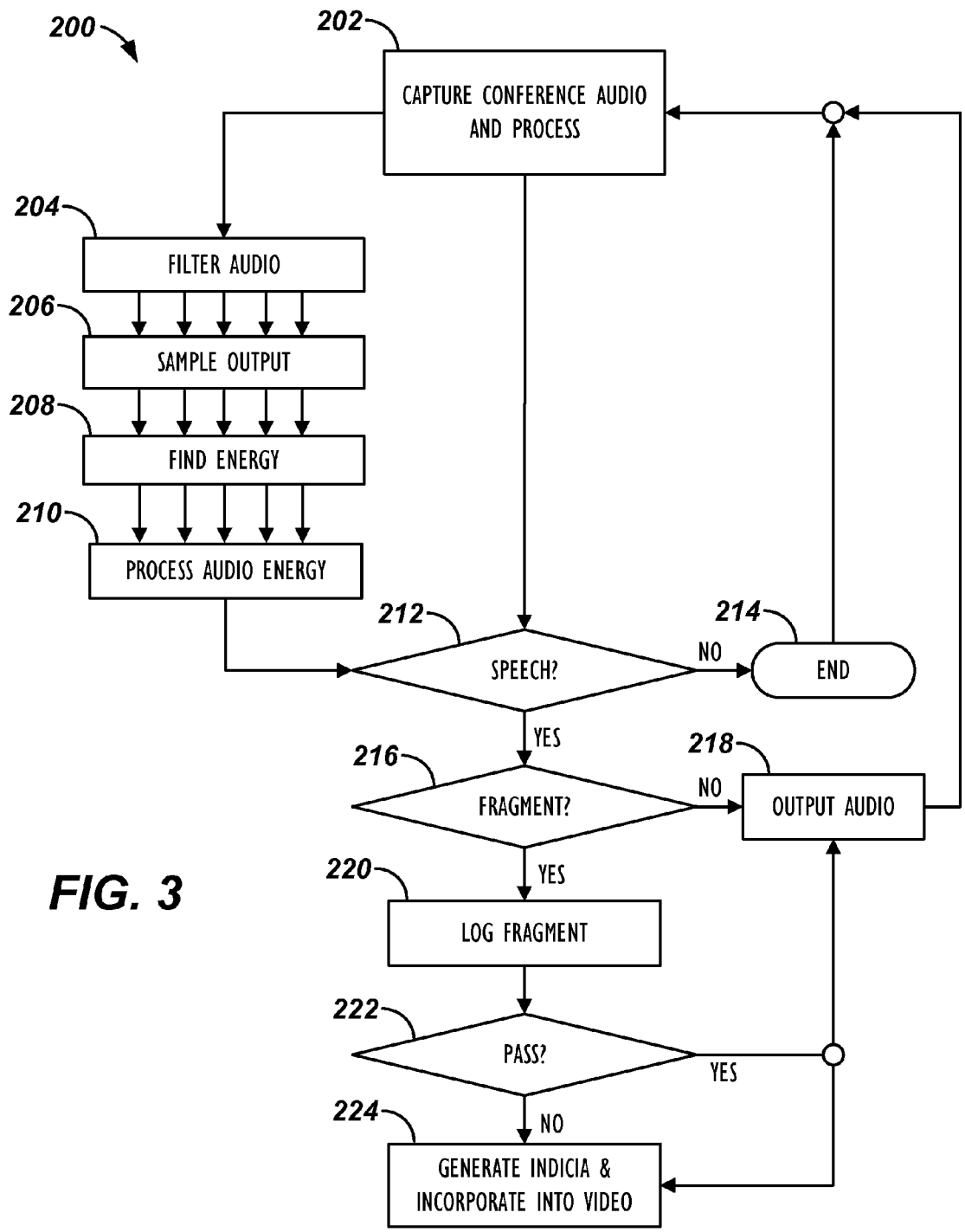
FIG. 3 illustrates a process of detecting speech and determining the detected speech as a fragment.
Figure 4:
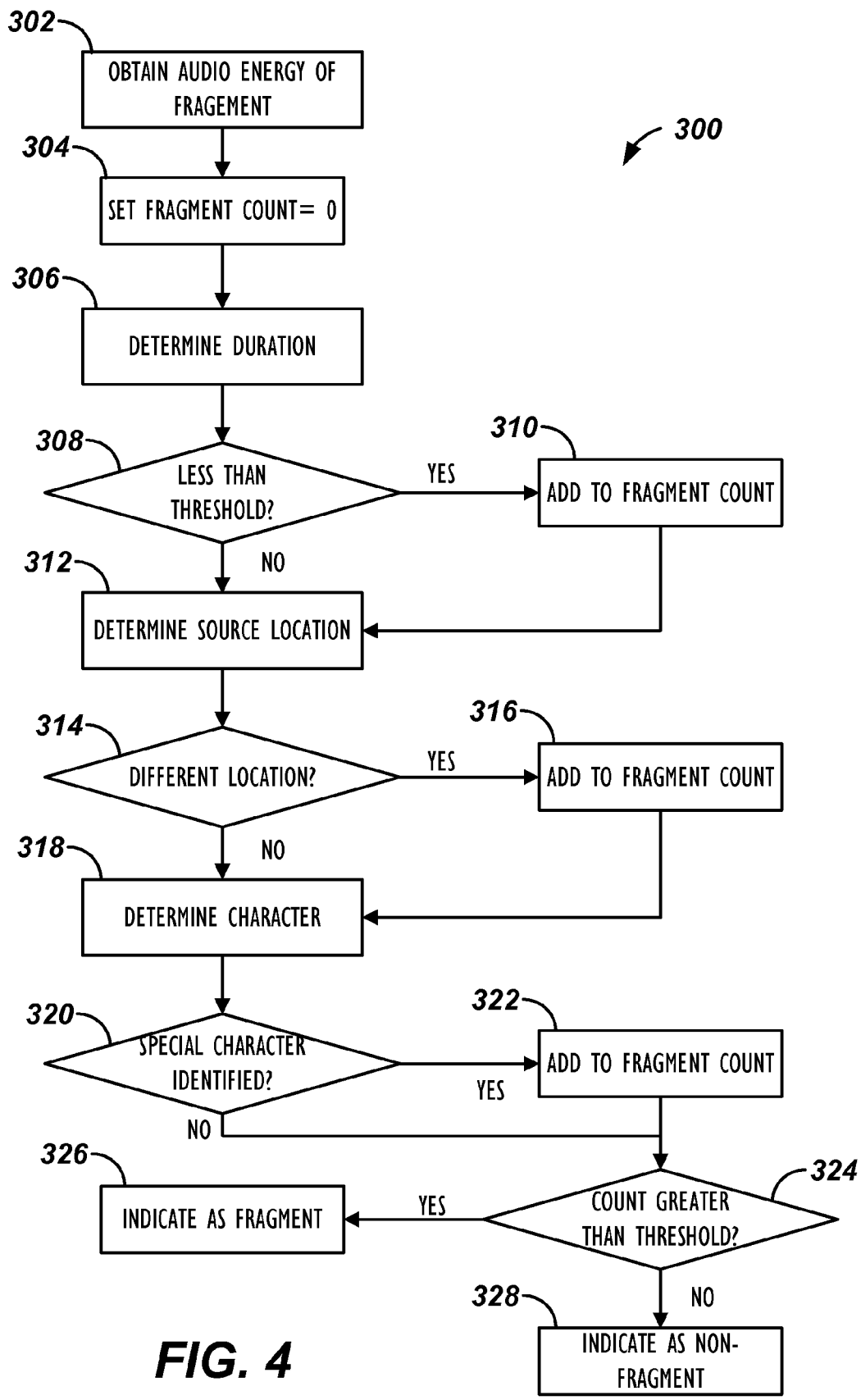
FIG. 4 illustrates a process of determining that a speech fragment is of interest.

With an understanding of a videoconferencing system 10, discussion now turns to FIGS. 3 through 4, which show a process of detecting speech fragments and conducting a videoconference accordingly.

Turning to FIG. 3, a process 200 for detecting speech fragments is illustrated in flow chart form. The discussion describes operation relative to the disclosed system 10 (i.e., the endpoint of FIG. 1A, the multipoint control unit of FIG. 2, or both). Of course, various modifications in the description will be evident to one skilled in the art having the benefit of the present disclosure. Some of these exceptions may be pointed out below.

Initially, the system 10 captures or obtains conference audio (Block 202) and performs various processes on the audio, such as determining source location of the captured audio, performing noise suppression, and cancelling echo— all to enhance the audio of the videoconference.

To even further enhance the videoconference according to the purposes herein, the system 10 also detects speech and determines if the detected speech is a speech fragment. For instance, the speech detector 34/134 can detect speech, and the speech fragment interpreter 36/136 can analyze the speech to detect fragments. As part of this processing, the speech detector 34/134 filters the audio with a filterbank (Block 204), samples the output (Block 206), finds the energy of the sampled audio in the various bands (Block 208), and processes the audio energy of the various bands (Block 210) to determine if the audio indicates speech (Decision 212). Qualifying the audio as speech can use known techniques, such as determining that the audio has the strongest energy in bands where human speech occurs. By using suitable analytic methods to qualify the audio as speech, whether short or long, the system 10 can reduce false alarms.

If the audio is not speech (no at decision 212), then processing to detect speech fragments on the current audio can end (Block 214), and the process 200 repeats to handle new conference audio (Block 202). More interestingly, if speech is detected (yes at decision 212), the system 10 determines if the speech is indicative of a speech fragment (Decision 216). Steps for making this determination are discussed below with reference to FIG. 4. In brief, the speech fragment interpreter 36/136 detects a speech fragment by analyzing the detected speech and determining that the detected speech meets specific criteria, such as being of a short duration, interrupting current speech, being initiated from a source location other than the current speaker, having a particular character, etc.

If the speech is not indicative of a fragment (i.e., it is part of audio of a participant while actively talking) (no at decision 216), the system 10 outputs the speech for sending to the far-end (Block 218), and the process repeats to handle new conference audio (Block 202). Of course, it will be appreciated that the processed signal is not what is sent to the far-end. Instead, the system 10 preferably processes the audio signal apart from the original signal, which is what is actually output to the far-end.

When the speech is a fragment (yes at decision 216), the system 10 may or may not block the speech fragment from being sent to the far-end depending on the circumstances. Initially, the system 10 may log the fragment for later decision making (Block 220). In logging the speech fragment, the system 10 records the occurrence, source, and time of occurrence of the speech fragments.

Then, the system 10 determines whether to pass the fragment in the output audio for the far-end (Decision 222). In some instances, for example, sending the speech fragment to the far-end may not be beneficial because it may cause confusion or unintelligible disruption at the far-end. For example, speech fragments that fall below one set of criteria, such as a particular duration and loudness, but above another criterion may be blocked from the audio exchange.

Other times, the speech fragment may be allowed to pass in the output audio (Block 218). For example, speech fragments that meet different criteria are also allowed to pass into the audio exchange. An intentional interruption, such as someone who strongly desires to interrupt the current audio flow, is an example of such a speech fragment suited for passing. As this occurs, there may be a short interval, resulting in a clipping of the beginning of such a fragment, in which the speech fragment is qualified; this clipping can be addressed by playing the beginning of the interruption with a delay and then speeding up the speech to catch up with the real-time speaker, by allowing it to remain clipped, or by some other means.

Regardless of whether the speech fragment is output or not, the system 10 can generate indicia of the speech fragment and incorporate the indicia into the audio and/or video to be output from the system 10 to the far-end (Block 224). The audio module's indicia generator 38/138 of the system 10 generates the indicia of an interpreted speech fragment and adds it to output audio. In addition or in the alternative, the video module's indicia generator 48/148 of the system 10 generates the indicia of an interpreted speech fragment and adds it to output video.

For example, the video module's indicia generator 48/148 maps the speech fragment to one of a plurality of graphical representations representing the speech fragment. As noted herein, the indicia can indicate in the video to the far-end that a participant would like to speak or interject in the current audio of the video conference. In this case, the system 10 turns a meeting participant's speech fragment into the equivalent of a raised hand in a classroom. To do this, the content of a participant's speech is separated from the fact that someone is speaking.

The system 10 measures and records all speech utterances that occur during the course of a conference. The system 10 matches the speech fragment by its determined character to a selected one of a number of visual cues. Then, the system 10 makes the selected visual cue available visually to some or all participants in the conference. (Comparable operations can be performed by the audio module's indicia generator 38/138 to map the speech fragment to one of a plurality of audible representations representing the speech fragment.)

An example of a speech fragment that would be blocked, but logged and signaled as indicia in the video to the far-end is when a person says "but . . . " and then decides not to interfere at that moment. This is a common example often caused by the interrupting participant thinking "oh, I'll ask my question later." Unfortunately, this self-censoring often results in good ideas being stifled through modesty or forgetfulness. In this instance, the system 10 maps the speech fragment (i.e., "but . . . ") when it meets suitable criteria and re-interprets it as a raised hand or other visual cue to be incorporated as an icon in the video output.

For actually signaling a "raised hand" or similar type of interruption, the system 10 displays a "raised hand" indicator and related information to one or more participants, allowing suitable action. The indicator for this signaling can use an on-video flag, an indication in a mobile device application, an audio indication such as a "beep," a highlighted name in a list of participants, a change of icon for the particular participant, a separate text or email message, a lit bulb, or any other form of indicia. The identity of an interrupter or raised hand may also be made available to some or all of the participants in the meeting, allowing for more effective management of their contribution.

In the processing described above, the system 10 treats unintelligible fragments of speech as sources of valuable content, and the system 10 uses fragments of speech to help guide the flow of interpersonal interaction in a teleconference. To do this, the system 10 transforms fragments of audio into audible and/or visual data to facilitate the management of live interaction. In the end, the system 10 can retain the naturalness of interaction between participants at remote sites. Passing some speech fragments, for example, assures that someone speaking can break through if they really want to interrupt, and the participant does not have to wait for a session manager to turn on their audio so they can talk.

The processing facilitates remote meetings by applying natural human dynamics. No special training is required, and more information is preserved. By using this technique, a momentary but intended interruption is allowed to persist, but this persistence does not mean that the conversation is disrupted at that moment.

FIG. 4 shows a process 300 for determining whether speech is a fragment of interest—e.g., a fragment for which the system 10 should generate an indication for passing in audio and/or video to other endpoints. The system 10 obtains the audio energy of the fragment (Block 302) and sets a count to zero (Block 304). As will be seen below, the count is used to eventually determine whether the speech is a fragment of interest.

In the processing, the system 10 determines the duration of the audio (Block 306) and compares the duration to a threshold (Decision 308). The duration threshold depends on the particulars of the implementation and may be preconfigured or may automatically adjust during operation of the system. If the threshold is exceeded (yes at decision 308), the system 10 adds to the fragment count (Block 310). Otherwise, the fragment count is not incremented.

In the next stage, the system 10 determines the source location of the audio (Block 312) and determines whether this source location is different from a current source location flagged in memory (Decision 314). Determining the source location of the audio of a talker in a conference can involve known techniques used in camera tracking of audio sources, such as disclosed in U.S. Pat. No. 6,593,956, which is incorporated herein by reference in its entirety. As source locations are determined, they can be stored in memory for later flagging and monitoring to determine which source location is currently speaking or not. If the source location is different from the current location speaking (yes at decision 314), then system 10 can add to the fragment count (Block 316) as this further indicates that the fragment is of import.

In one implementation of determining source location, the system 10 can also or alternatively use speaker recognition to determine that the speech is a fragment. Here, for example, the speaker recognition can be based on mel-frequency cepstrum (MFC) so that the speech characteristics stored in the database 25 can include mel-frequency cepstral coefficients (MFCCs). The techniques for deriving these coefficients are known in the art and not detailed herein. Yet, the system 10 can use any other techniques known in the art for identifying speech characteristics and recognizing speakers therefrom. Each participant has speech characteristics stored about them so that when they speak, detected characteristics and be compared to stored characteristics to figure out the identity (and their associated location in the video-conference).

In the next stage, the system 10 determines the character of the speech (Block 318) and determines if the character of the speech meets some special criteria (Decision 320). If a special character of the speech is identified (yet at decision 320), then the system 10 adds to the fragment count (Block 322). For example, common fragmentary phrases used by participants can be characterized in terms of intonation, pitch, inflection, emotion, duration, and other features. The common phrases can be indicative of interruption, such as when one says "But I think . . . "; "yes, but"; "and"; etc. and can be other common interruptive types of phrases. Such phrases can be analyzed using speech recognition techniques to quantify particular details of intonation, pitch, inflection, emotion, duration, and other features, which can be stored for later comparison. Then, when the current fragment is analyzed, the same speech recognition techniques can be applied to quantify its particular details, which can then be compared to the phrases stored in memory. A comparable character of the fragment can then be determined from the comparison and used in adding or not adding to the fragment count for the processed fragment.

Finally, the system 10 takes the fragment count and compares it to a threshold (Decision 324). If the count exceeds the threshold, then the system 10 indicate the audio as a fragment (Block 326) so that the fragment can be processed according to the procedures discussed previously. Otherwise, the system 10 indicates the audio as a non-fragment (Block 328).

The processing decisions noted above have been described as yes-or-no decisions, but some or all of these may be implemented as "soft" decisions. Additionally, the count associated with determining whether the speech is a fragment or not can be more general than incremental and can rely on statistical and probabilistic features.

Figure 5:
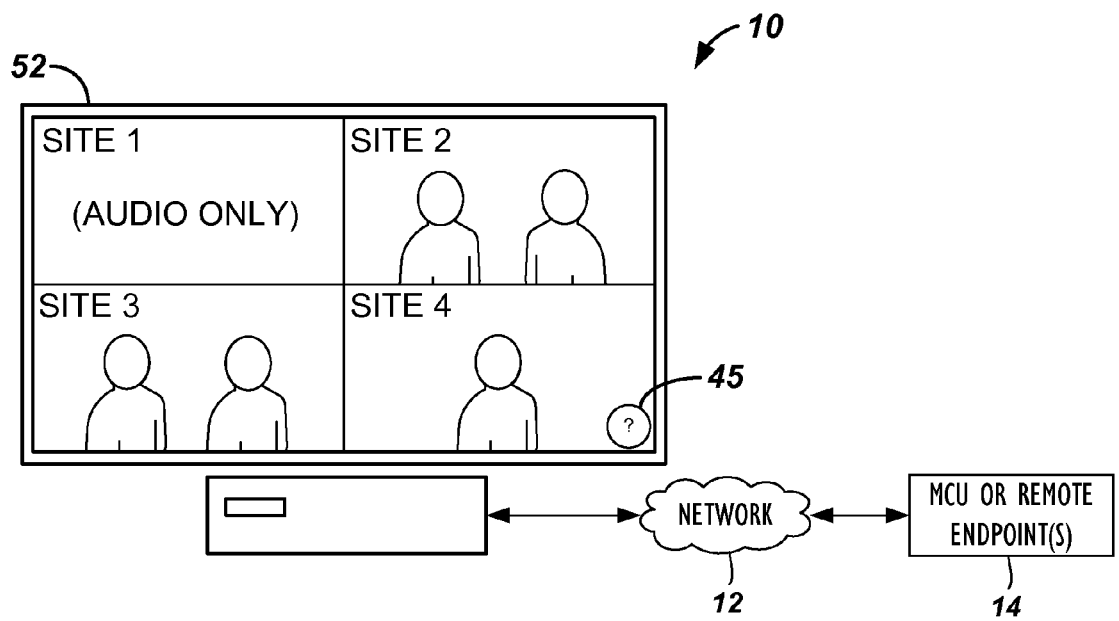
FIG. 5 illustrates a videoconferencing system having a display with indicia of a speech fragment.

FIG. 5 represents an example of a videoconferencing system 10 displaying video of various endpoints or sites on a display 52. The system 10 receives conference video and audio from the various far-end endpoints 14 or from a multipoint control unit. Processing the audio for speech fragments can be performed locally at the near-end or can be performed upstream at the multipoint control unit as noted herein. Similarly, the video for output to the display 52 can be comparably handled. Either way, an indicium or visual cue 45 of an interjection or other speech fragment can be included in the video and then displayed on the system's display 52. For instance, participants at Site 2 on the display 52 may be the current speaker, but the participant at Site 4 has interjected with a speech fragment that may or may not be passed for output by the system's loudspeakers. However, the visual cue 45 is generated and added to the video for that site 4 on the display 52.

Any number of visual cues 45 can be used and can be directly related to the determined character of the speech fragment. For instance, the cue 45 depicted in FIG. 5 includes a question mark, which would be indicative of an interjection of a questioning character. As another example, the cue could be an exclamation mark indicative of an objection to the current conversation of the conference. As will be appreciated, any types of visual cues can be used, but are not detailed herein for the sake of brevity.

Some connections of endpoints to the conference may be audio only and may not include conference video. See e.g., Site 1. Such endpoints can still have indicia included for any speech fragments occurring in their output audio. As can be seen with the present system 10, participation in a meeting is democratized by bringing higher visibility to all participants, even those participants having audio-only connections or poorer video.

Although discussed above in context of a videoconference, it will be appreciated that the teachings of the present disclosure can be applicable to audio-only conferences. In such a case, the indicia associated with a speech fragment can be a visual cue occurring on a display, light, keyboard, or the like of a speakerphone or other comparable conferencing device. Alternatively, the indicia associated with a speech fragment rather than being a visual cue can be an audio cue, such as a particular beep or tone added to the audio of the conference. In this way, the disclosed system 10 can improve meeting effectiveness and comfort regardless of the type of media, including audio-only meetings, video meetings, and mixed video and audio meetings.

Figure 6:
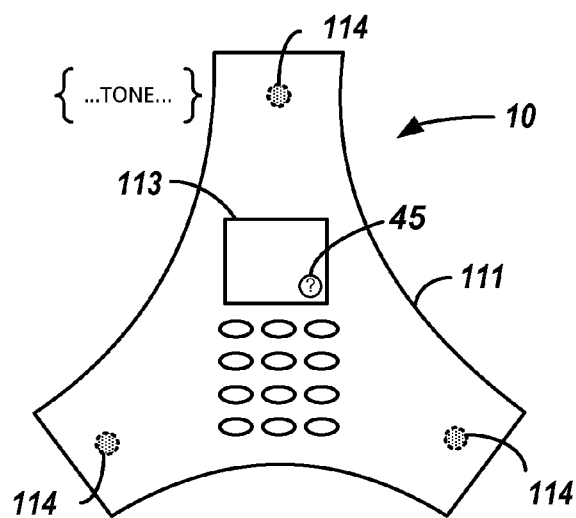
FIG. 6 illustrates an audio conferencing system having audible and visual indicia of a speech fragment.

For example, FIG. 6 illustrates an audio conferencing system 10 in the form of a conferencing endpoint or speakerphone 111. An audio cue ({ . . . TONE . . . }) indicative of a speech fragment during the conference is output by speakers 114. In addition or in the alternative, a visual cue 45 indicative of a speech fragment during the conference is output on a display 113.

Digital electronic circuitry, computer hardware, firmware, software, or any combination thereof can implement the techniques of the present disclosure, and a computer program tangibly embodied in a machine-readable medium for execution by a programmable processor can also implement the disclosed techniques so that a programmable processor can execute a program of instructions to perform functions of the disclosed techniques by operating on input data and generating output. Suitable processors include, by way of example, both general and special purpose microprocessors. Generally, a processor will receive instructions and data from a read-only memory and/or a random access memory.

Generally, a computer includes one or more mass storage devices (e.g., magnetic disks, internal hard disks, removable disks, magneto-optical disks, optical disks, etc.) for storing data files. Storage devices suitable for tangibly embodying computer program instructions and data include all forms of program storage devices and non-volatile memory, including by way of example, semiconductor memory devices (e.g., EPROM, EEPROM, and flash memory devices), magnetic disks (e.g., internal hard disks and removable disks), magneto-optical disks, CD-ROM disks, and other computer-readable media. Any of the foregoing can be supplemented by or incorporated into application-specific integrated circuits.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A conferencing method, comprising:
obtaining audio of a conference for an endpoint;
detecting speech in the obtained audio;
determining that the detected speech constitutes a speech fragment by determining that a duration of the detected speech is less than a predetermined duration;
generating an indicium indicative of the determined speech fragment; and
including the generated indicium in data of the conference for an endpoint.

2. The method of claim 1, wherein the included indicium is separate from the audio associated with the detected speech fragment.

3. The method of claim 1, wherein detecting speech in the obtained audio comprises filtering the audio and finding energy levels of the filtered audio indicative of speech.

4. The method of claim 1, wherein the method comprises determining source identities of detected speech during the conference and storing the determined source identities in memory, and wherein determining that the detected speech constitutes the speech fragment comprises determining that the detected speech is associated with a new source identity different than a current source identity stored in memory.

5. The method of claim 4, wherein determining the source identities of the detected speech comprises determining relative spatial locations of the sources of the detected speech in a conference environment.

6. The method of claim 4, wherein determining the source identities of the detected speech comprises performing speech recognition of the detected speech and associating the recognized speech to participants as the source identities.

7. The method of claim 1, wherein determining that the detected speech constitutes the speech fragment comprises determining that a character of the detected speech meets at least one criterion.

8. The method of claim 7, wherein the at least one criterion is selected from the group consisting of an intonation, a pitch, an inflection, an emotion, a duration, and a quantified speech recognition detail.

9. The method of claim 1, wherein generating the indicium indicative of the determined speech fragment comprises generating a visual cue; and wherein including the generated indicium in the data of the conference comprises including the visual cue in video data of the endpoint.

10. The method of claim 9, wherein generating the visual cue comprises matching the determined speech fragment to one of a plurality of the visual cues, and selecting the matched visual cue for inclusion as the generated indicium.

11. The method of claim 1, wherein generating the indicium indicative of the determined speech fragment comprises generating an audio cue; and wherein including the generated indicium in the data of the conference comprises including the audio cue in audio data of the endpoint.

12. The method of claim 11, wherein generating the audio cue comprises matching the determined speech fragment to one of a plurality of the audio cues, and selecting the matched audio cue for inclusion as the generated indicium.

13. The method of claim 1, further comprising outputting the audio associated with the speech fragment.

14. The method of claim 1, further comprising preventing output of the audio associated with the speech fragment.

15. A program storage device having program instructions stored thereon for causing a programmable control device to perform a conferencing method, the method comprising:
obtaining audio of a conference for an endpoint;
detecting speech in the obtained audio;
determining that the detected speech constitutes a speech fragment by determining that a duration of the detected speech is less than a predetermined duration;
generating an indicium indicative of the determined speech fragment; and
including the generated indicium in data of the conference.

16. A conferencing apparatus, comprising:
an audio interface obtaining audio of a conference; and
a processing unit operatively coupled to the audio interface and configured to:
detect speech in the obtained audio,
determine that a duration of the detected speech is less than a predetermined duration to determine that the detected speech constitutes a speech fragment,
generate an indicium indicative of the determined speech fragment, and
include the generated indicium in data of the conference for an endpoint.

17. The apparatus of claim 16, further comprising an output interface operatively coupled to the processing unit, wherein the processing unit is configured to handle the audio associated with the speech fragment with the output interface.

18. The apparatus of claim 16, wherein the apparatus comprises a conferencing endpoint operatively coupled to a network.

19. The apparatus of claim 16, wherein the apparatus comprises a multipoint control unit operatively coupled to one or more conferencing endpoints via a network.

20. A conferencing method, comprising:
obtaining audio of a conference for an endpoint;
detecting speech in the obtained audio;
determining that the detected speech constitutes a speech fragment;
generating an indicium indicative of the determined speech fragment by generating an audible cue; and
including the generated indicium in data of the conference by including the audible cue in audio data of the endpoint.

21. The method of claim 20, wherein the method comprises determining source identities of detected speech during the conference and storing the determined source identities in memory, and wherein determining that the detected speech constitutes the speech fragment comprises determining that the detected speech is associated with a new source identity different than a current source identity stored in memory.

22. The method of claim 21, wherein determining the source identities of the detected speech comprises: determining relative spatial locations of the sources of the detected speech in a conference environment; or performing speech recognition of the detected speech and associating the recognized speech to participants as the source identities.

23. The method of claim 20, wherein determining that the detected speech constitutes the speech fragment comprises determining that a character of the detected speech meets at least one criterion, wherein the at least one criterion is selected from the group consisting of an intonation, a pitch, an inflection, an emotion, a duration, and a quantified speech recognition detail.

24. The method of claim 20, wherein generating the indicium indicative of the determined speech fragment comprises generating a visual cue; and wherein including the generated indicium in the data of the conference comprises including the visual cue in video data of the endpoint.

25. The method of claim 20, further comprising outputting the audio associated with the speech fragment; or preventing output of the audio associated with the speech fragment.

26. A program storage device having program instructions stored thereon for causing a programmable control device to perform a conferencing method, the method comprising:
obtaining audio of a conference for an endpoint;
detecting speech in the obtained audio;
determining that the detected speech constitutes a speech fragment;
generating an indicium indicative of the determined speech fragment by generating an audible cue; and
including the generated indicium in data of the conference by including the audible cue in audio data of the endpoint.

27. A conferencing apparatus, comprising:
an audio interface obtaining audio of a conference; and
a processing unit operatively coupled to the audio interface and configured to:
detect speech in the obtained audio,
determine that the detected speech constitutes a speech fragment,
generate an audible cue to generate an indicium indicative of the determined speech fragment, and
include audible cue in audio data of the endpoint to include the generated indicium in data of the conference.

28. A conferencing method, comprising:
obtaining audio of a conference for an endpoint;
detecting speech in the obtained audio;

determining that the detected speech constitutes a speech fragment;

generating an indicium indicative of the determined speech fragment;

including the generated indicium in data of the conference; and preventing output of the audio associated with the speech fragment.

29. The method of claim 28, wherein the method comprises determining source identities of detected speech during the conference and storing the determined source identities in memory, and wherein determining that the detected speech constitutes the speech fragment comprises determining that the detected speech is associated with a new source identity different than a current source identity stored in memory.

30. The method of claim 29, wherein determining the source identities of the detected speech comprises: determining relative spatial locations of the sources of the detected speech in a conference environment; or performing speech recognition of the detected speech and associating the recognized speech to participants as the source identities.

31. The method of claim 28, wherein determining that the detected speech constitutes the speech fragment comprises determining that a character of the detected speech meets at least one criterion, wherein the at least one criterion is selected from the group consisting of an intonation, a pitch, an inflection, an emotion, a duration, and a quantified speech recognition detail.

32. The method of claim 28, wherein generating the indicium indicative of the determined speech fragment comprises generating a visual cue; and wherein including the generated indicium in the data of the conference comprises including the visual cue in video data of the endpoint.

33. A program storage device having program instructions stored thereon for causing a programmable control device to perform a conferencing method, the method comprising:

obtaining audio of a conference for an endpoint;

detecting speech in the obtained audio;

determining that the detected speech constitutes a speech fragment;

generating an indicium indicative of the determined speech fragment;

including the generated indicium in data of the conference; and preventing output of the audio associated with the speech fragment.

34. A conferencing apparatus, comprising:

an audio interface obtaining audio of a conference; and a processing unit operatively coupled to the audio interface and configured to:

detect speech in the obtained audio, determine that the detected speech constitutes a speech fragment, generate an indicium indicative of the determined speech fragment, include the generated indicium in data of the conference, and prevent output of the audio associated with the speech fragment.

* * * * *